United States Patent [19]

Pitts et al.

[11] Patent Number: 5,027,267

[45] Date of Patent: Jun. 25, 1991

[54] AUTOMATIC MIXTURE CONTROL APPARATUS AND METHOD

[75] Inventors: Alan J. Pitts, Comanche; Leonard R. Case; James E. Broaddus, both of Duncan, all of Okla.

[73] Assignee: Halliburton Company, Duncan, Okla.

[21] Appl. No.: 332,314

[22] Filed: Mar. 31, 1989

[51] Int. Cl.[5] ...................... G06F 15/46; G05D 11/13

[52] U.S. Cl. .................................. 364/172; 364/502; 364/510; 364/558; 366/17; 366/152

[58] Field of Search ............... 364/172, 173, 422, 500, 364/502, 509, 510, 558, 140; 366/8, 17, 29, 43, 132, 133, 142, 151-153, 160; 137/3, 88, 101.19, 101.21; 222/1, 52, 55, 56, 57

[56] References Cited

U.S. PATENT DOCUMENTS

| | | | |
|---|---|---|---|
| 3,379,421 | 4/1968 | Putman | 366/17 |
| 3,908,967 | 9/1975 | Merritt | 366/17 |
| 3,940,600 | 2/1976 | Alexander et al. | 364/173 X |
| 4,003,431 | 1/1977 | Novotny et al. | 366/17 X |
| 4,265,266 | 5/1981 | Kierbow et al. | 137/101.19 |
| 4,326,411 | 4/1982 | Gant et al. | 73/155 |
| 4,327,759 | 5/1982 | Millis | 366/152 X |
| 4,353,482 | 10/1982 | Tomlinson et al. | 222/1 |
| 4,410,106 | 10/1983 | Kierbow et al. | 222/135 |
| 4,427,133 | 1/1984 | Kierbow et al. | 222/77 |
| 4,432,064 | 2/1984 | Barker et al. | 364/550 |
| 4,538,221 | 8/1985 | Crain et al. | 364/172 |
| 4,538,222 | 8/1985 | Crain et al. | 364/172 |
| 4,571,993 | 2/1986 | St. Onge | 73/151 |
| 4,593,365 | 6/1986 | Haley, Jr. et al. | 364/510 |
| 4,654,802 | 3/1987 | Davis | 364/502 |
| 4,701,095 | 10/1987 | Berryman et al. | 414/332 |
| 4,715,721 | 12/1987 | Walker et al. | 366/132 |
| 4,747,060 | 5/1988 | Sears, III et al. | 364/481 |
| 4,751,648 | 6/1988 | Sears, III et al. | 364/422 |
| 4,779,186 | 10/1988 | Handke et al. | 364/172 |

OTHER PUBLICATIONS

Halliburton Services cementing technical data bulletin, "Lanmarc System", [brochure C-1333 (Rev.)] (published prior to Mar. 27, 1988).

Pp. 3838-3839 of Halliburton Services Sales & Service Catalogue No. 41 (published prior to Mar. 27, 1988).

Halliburton Services general technical data bulletin, "Automatic Proppant Control System (APCS)", [brochure G-9156 (Rev.)], (published prior to Mar. 27, 1988).

"Precision Meets Dependability for the Perfect Mix. Introducing the Pod Blender, Only from Dowell Schlumberger", (believed published prior to Mar. 27, 1988).

"The Pod Has Landed", (believed published prior to Mar. 27, 1988).

*Primary Examiner*—Joseph Ruggiero

*Attorney, Agent, or Firm*—James R. Duzan; E. Harrison Gilbert, III

[57] ABSTRACT

An automatic mixture control apparatus includes a micro-computer-based data acquisition and control device which responds in real time to flowmeter and densimeter signals to control water inlet and bulk cement valves so that a cement slurry is produced at the desired rate and density. The data acquisition and control device is programmed to provide means for computing desired positions for the valves and for computing corrections for the positions. A related automatic mixture control method is also disclosed.

14 Claims, 2 Drawing Sheets

AUTOMATIC MIXTURE CONTROL APPARATUS AND METHODBACKGROUND OF THE INVENTION

This invention relates generally to apparatus and methods for automatically controlling the production of a mixture so that the mixture has a desired density and a desired mixing rate and more particularly, but not by way of limitation, to apparatus and methods for automatically controlling the production of a cement slurry so that the cement slurry has a desired density and a desired mixing rate.

In the oil and gas industry, cement slurries are made to cement structures (e.g., liners) in a well bore or to seal the bore shut, for example. Each cement slurry broadly includes a dry cementing composition and a carrier fluid, such as water. In a particular slurry, these components must be mixed in particular proportions to obtain a specific slurry density suitable for a particular job. It is important to control density because of the effect density has on hydrostatic well pressure, cement strength, pumpability and other variables.

A current mixing system is the Halliburton Services RCM TM cement slurry mixing system. In this system, dry cement and water are mixed, circulated and weighed through a slurry circuit which includes a dual compartment mixing tub, manually controlled inlet valves for the dry cement and the water, and a circulating pump connected to one compartment of the tub. A high pressure pump is connected to the other tub compartment. This other tub compartment is separated from the first compartment by a weir over which prepared slurry flows from the first compartment for retention in the second compartment until it is pumped into the well by the high pressure pump. In this system, the density and the mixing rate of the slurry are controlled by an operator who manually adjusts the inlet valves to control the flow of water and dry cement into the slurry circuit.

The manual control used in the present RCM TM slurry mixing system works, but it has shortcomings. It is dependent on human response; therefore, corrective control of the inlet valves may not always be consistent from correction to correction and from job to job. This can produce slurries with less than optimum characteristics. The manual control is also time consuming for the operator who typically oversees other operations which need to be monitored at the same time as the mixing operation. This can lead to less than optimum supervision of the various operations. Thus, there is the need for an automatic mixture control apparatus and method by which these shortcomings can be overcome. Such an apparatus and method should automatically monitor pertinent parameters of the mixing system and automatically control the water and cement inlet valves to produce a slurry having a desired density and also preferably a desired mixing rate. Having a desired density is important as referred to above, and having a desired mixing rate is important due to limited pumping times and the improvement of cement bonds.

SUMMARY OF THE INVENTION

The present invention overcomes the above-noted and other shortcomings of the prior art by providing a novel and improved automatic mixture control apparatus and method. In a specific implementation, the present invention provides an electronic control system which can be added to the RCM TM cement slurry mixing system to automatically control the slurry density and the mixing rate. This reduces the supervision and skill needed by an operator, thereby allowing the operator more time to perform other tasks.

A general advantage of the present invention is that it provides for automatically controlling density to produce a mixture having a consistent quality throughout the entire mixing process. It also provides automatically controlling mixing rate in a preferred embodiment.

The present invention in a preferred embodiment automatically monitors inlet water flow rate and slurry density, and it automatically controls inlet valves through which the components of the mixture are added.

In a preferred embodiment the present invention is microcomputer based, thereby allowing easy adaptability to various mixing systems and to applications other than mixing cement slurries. Use of a microcomputer also allows quick, consistent response to better insure that the desired mixture is obtained throughout the mixing process. A microcomputer also allows changes in the desired mixture parameters to be easily entered and executed during the mixing process.

The apparatus provided by the present invention automatically controls the production of a mixture so that the mixture has a desired density and, preferably, a desired mixing rate. This apparatus comprises: a conduit; first valve means, connected to the conduit, for controllably passing a first substance into the conduit; second valve means, connected to the conduit, for controllably passing a second substance into the conduit; flow detecting means for detecting the flow rate of the second substance passed through the second valve means; density detecting means for detecting the density of the mixture; and control means, connected to the first valve means, the second valve means, the flow detecting means and the density detecting means, for automatically controlling the operation of the first and second valve means in response to the detected flow rate and density and a desired density and mixing rate entered in the control means.

In a preferred embodiment, the control means of the apparatus includes means for computing a desired position, $P_v$, to which the first valve means is to be moved and for computing a desired position, $P_j$, to which the second valve means is to be moved, wherein:

$$P_v=[(M_c)(R)/3.1]P_c \text{ and } P_j=V_w/3.33,$$

where:

$$M_c = \frac{V_s \times 42 \times (P_d - P_w)}{1 - P_w/P_c}$$

$$P_c = \frac{(\alpha \times P_s - P_w)}{(\alpha - 1)}$$

$$\alpha = \frac{7.48 \times Y}{r_w}$$

$$V_w = \frac{P_d \times V_s \times 42 - M_c}{P_w}$$

$\alpha$=slurry/water ratio
Y=yield of the mixture
$r_w$=liquid substance requirement
$P_c$=absolute density of the dry substance
$P_s$=mixture design density $M_c$=mass rate of the dry substance $V_s$=desired mixing rate $P_d$=desired mixture density $P_w$=density of liquid substance R=ratio of liquid substance being delivered to desired liquid substance rate $V_w$=mix liquid substance rate The aforementioned preferred embodiment further includes, within the control means, means for correcting the positions of the first and second valve means, including means for computing:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

$E_c$=error in dry substance delivery in pounds per minute $P_a$=actual mixture density measured by the density detecting means $M_{ce}$=mass rate of dry substance due to error $E_c$ $\int E_c$=time integral of error $E_c$ $\frac{dE_c}{dt}$ = time derivative of error $E_c$; and means for computing:

$$E_w = V_d - V_a$$

$$V_e = 0.0 \times E_w + 0.2 \times \int E_w + 0.1 \times \frac{dE_w}{dt}$$

where $E_w$=error in the liquid substance rate $V_d$=desired liquid substance rate $V_a$=actual liquid substance rate as measured by the flow detecting means $V_e$=volume rate of liquid substance due to error $E_w$ $\int E_w$=time integral of error $E_w$ and $\frac{dE_w}{dt}$ = time derivative of error $E_w$.

The present invention also provides a method in accordance with the foregoing. In a preferred embodiment, the method is for automatically producing a cement slurry having a desired density and mixing rate. This method comprises the steps of: (a) entering into a computer data including a desired slurry density, a desired mixing rate, a desired water requirement and a desired yield; (b) operating a water inlet valve with the computer so that a quantity of water is flowed into a slurry producing circuit; (c) operating a cement inlet valve with the computer so that a quantity of dry cement is added into the slurry producing circuit and the quantity of water to produce a slurry having the desired slurry density; (d) circulating the slurry through the slurry producing circuit; and (e) concurrently operating the water inlet valve and the cement inlet valve with the computer to add more water and cement into the slurry producing circuit, thereby producing more slurry, while maintaining the desired slurry density and mixing rate.

Therefore, from the foregoing, it is a general object of the present invention to provide novel and improved apparatus and method for automatically controlling the production of a mixture so that the mixture has a desired density and mixing rate. Other and further objects, features and advantages of the present invention will be readily apparent to those skilled in the art when the following description of the preferred embodiment is read in conjunction with the accompanying drawings.

DETAILED DESCRIPTION OF THE PREFERRED EMBODIMENT

Figure 1:
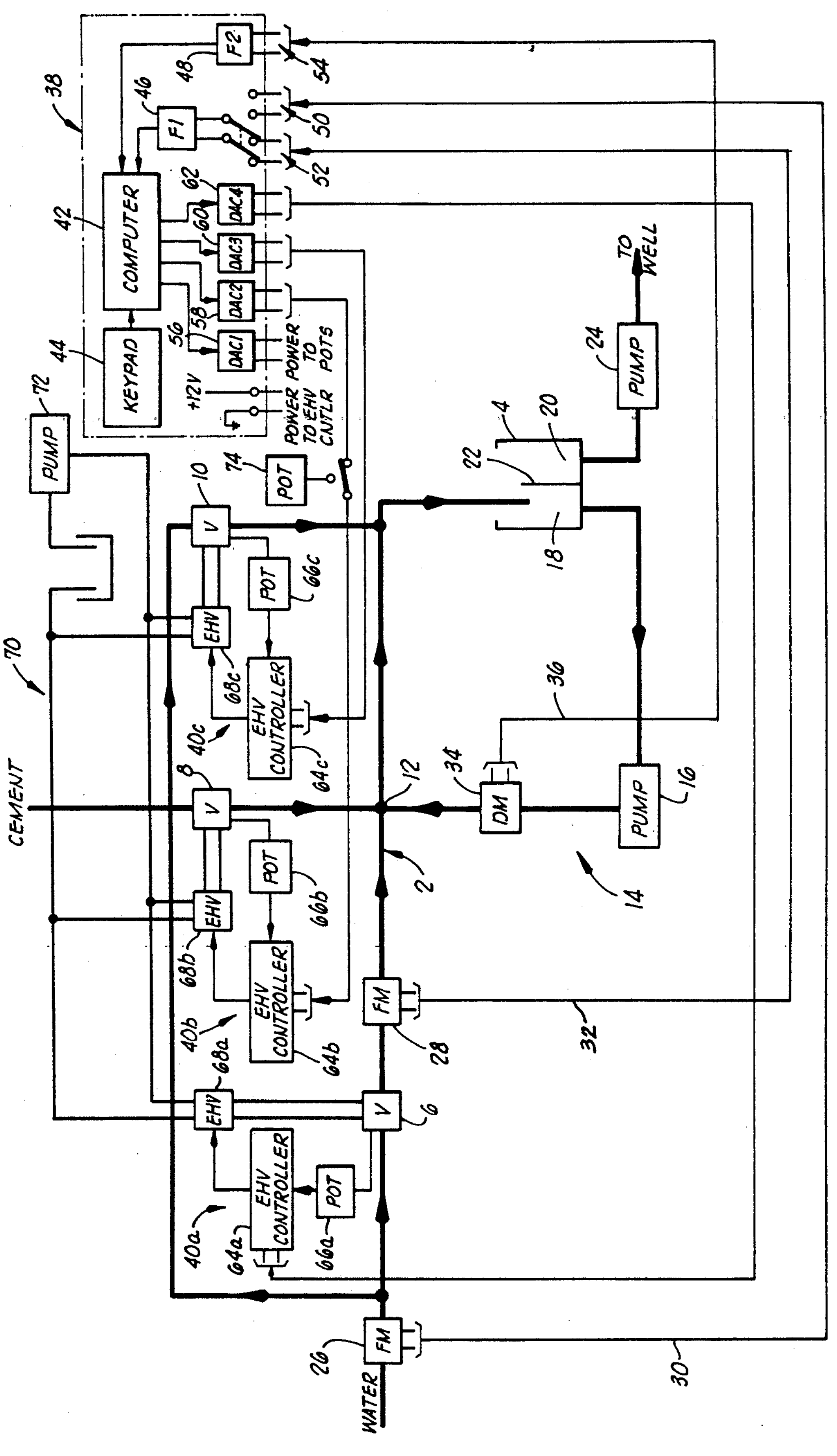
FIG. 1 is a functional block diagram of the preferred embodiment of the automatic mixture control apparatus of the present invention.

The preferred embodiment of the automatic mixture control apparatus of the present invention is schematically illustrated in FIG. 1. The preferred embodiment will be described with reference to a slurry mixing or producing system such as the Halliburton Services RCM TM system.

The slurry system includes an inlet conduit 2 which at one end connects to a water source and at its other end feeds into a mixing tub 4. The conduit 2 is of conventional construction, and in the preferred embodiment it is made of a conventional material and manner to carry water and a cement composition which are to be combined to form the desired cement slurry for which the preferred embodiment of the present invention is particularly adapted.

Connected to the conduit 2 is a valve 6 for controllably passing a liquid substance, particularly the water in the FIG. 1 embodiment, through the conduit 2. In the preferred embodiment, this is a conventional water inlet valve which has a variable orifice whose area is varied by a valve member which is moved or positioned in response to a rotary force. In the preferred embodiment, the valve 6 is a butterfly valve located upstream of a conventional jet (not shown) which provides suitable mixing energy at low flow rates.

Forming another part of the slurry system is a valve 8 for controllably passing a dry substance, namely the cement in the FIG. 1 embodiment, into the conduit 2. In the preferred embodiment, the valve 8 is a conventional bulk cement inlet valve having a variable orifice through which a controlled amount of cement is admitted to the conduit 2 downstream of the water inlet valve 6. The valve 8 (i.e., the valve member thereof by which the orifice is controlled) is positioned in response to a rotary force.

The preferred embodiment slurry system shown in FIG. 1 also includes a valve 10 which is another water inlet valve. The valve 10 is connected in parallel to the valve 6 to allow increased water flow into the conduit in excess of what can be admitted through the water jet downstream of the valve 6. As shown in FIG. 1, the valve 10 admits water into the conduit 2 downstream of a mixing point 12 (the point at which the water jet is located) where the cement passed through the valve 8 first mixes with the water admitted through the valve 6. The valve 10 is also a conventional valve, but the water from it need not be sent through the jet at location 12 because it is contemplated there should be enough mixing energy in the slurry system at the flow rates at which the valve 10 is contemplated to be used to supplement the flow rate achieved through the valve 6.

The slurry system also includes a circulating loop 14 through which the mixture of the dry substance and the liquid substance, particularly the resultant cement slurry in the preferred embodiment, are circulated. The loop 14 includes a portion of the conduit 2 and a circulating circuit. The circulating circuit includes the mixing tub 4 and a circulating pump 16. The pump 16 pumps slurry from a first, pre-mix compartment 18 of the tub 4 to the conduit 2 (as illustrated, specifically the mixing point 12 of the conduit 2). The pump 16 can be a conventional type, such as the type used in the RCM TM system. The tub 4 is also a conventional type wherein the compartment 18 is separated from a downhole compartment 20 by a weir 22 over which slurry flows from the compartment 18 into the compartment 20 for being pumped into a well by means of a conventional downhole pump 24 connected to the compartment 20.

Interfaced with the slurry system is the control system of the present invention.

The control system includes two characteristic detecting means for detecting characteristics of the substances passed by the valves 6, 10. In the illustrated embodiment, these are flow detecting devices embodied in the preferred embodiment by conventional flowmeters 26, 28. The flowmeter 26 detects and generates an electrical signal in response to the total flow of water through both of the valves 6, 10. The flowmeter 28 is located downstream of the valve 6 so that it monitors the flow only with respect to the valve 6. In the preferred embodiment the flowmeters 26, 28 are Halliburton Services turbine flowmeters. Fluid flowing through one of the flowmeters causes vanes in the flowmeter to turn, thereby generating electrical pulses in a magnetic pickup of the flowmeter. This electrical signal, designating by its frequency a measurement of the detected flow rate, is transmitted through respective electrical cables generally designated by the reference numerals 30, 32 for the flowmeters 26, 28, respectively.

The control system also includes a characteristic detecting means for detecting a characteristic of the mixture. In the illustrated embodiment, this is a conventional density detecting device 34 for detecting the density of the mixture circulated through the circulation circuit of the loop 14. In the preferred embodiment, the density detecting device 34 is a Halliburton Services densimeter wherein a radioactive source therein causes electrical pulses to be generated in a radiation detector therein. This electrical signal is transmitted on an electrical cable 36. The frequency of the signal is a function of the slurry density.

The electrical signals provided over the cables 30, 32, 36 are used by a control means of the present invention to calculate actual flow rates and densities. In response to those and other calculations described further hereinbelow, the control means generates electrical signals for automatically controlling the operation of the valves 6, 8 (and valve 10 when used). The control means includes a data acquisition and control device 38 and closed-loop electrohydraulic valve control circuits 40*a*, 40*b*, 40*c*.

The data acquisition and control device 38 is implemented in the preferred embodiment by a modified Halliburton Services UNIPRO TM device which is described in U.S. Pat. No. 4,747,060 to Sears, III, et al., which patent is incorporated herein by reference. The modifications are the addition of two digital-to-analog converters and application software to implement the control algorithms further described hereinbelow.

A conventional UNIPRO TM data acquisition device includes a computer 42, specifically a pair of digital microcomputers communicating through a shared random access memory. The computer 42 receives control parameters, such as desired density, through a data entry device embodied in a UNIPRO TM by a keypad 44. The computer 42 receives real-time operating condition data through two frequency-to-binary converter circuits 46, 48. The frequency converter circuit 46 is switchable between two inputs 50, 52 connected to the cables 30, 32, respectively. The frequency converter 48 is connected to the cable 36 for receiving the density indicating signal through an input 54.

The computer 42 provides electrical control signals through digital-to-analog converters (DAC) 56, 58, 60, 62. In the preferred embodiment, the DAC 56 is used to provide a 10.4 VDC voltage across potentiometers described hereinbelow. The DAC 58 provides an analog electrical control signal for controlling the valve 8. The DAC 60 and the DAC 62 are add-ons (which can be readily implemented by those skilled in the art) to the conventional UNIPRO TM device, and they provide analog electrical control signals to the valves 10, 6, respectively.

In the preferred embodiment illustrated in FIG. 1, only one UNIPRO TM device needs to be used; however, it can be used with the overall system described in U.S. Pat. No. 4,747,060 and U.S. Pat. No. 4,751,648 to Sears, III, et al., also incorporated herein by reference.

The control signals provided through the DAC's 58–62 are used by the closed-loop electrohydraulic valve control circuits 40*a*, 40*b*, 40*c* to control the positions of their respective slurry component inlet valves 6, 8, 10, respectively. Each of the circuits 40*a*, 40*b*, 40*c* is constructed of the same components as indicated by the use of the same reference numerals; therefore, only the circuit 40*a* will be described in detail.

The valve control circuit 40*a* includes an electrohydraulic valve controller 64*a* of a conventional type, such as a Parker brand valve controller. The controller 64*a* receives the analog signal from the respective DAC of the data acquisition and control device 38 (the DAC 62 for the FIG. 1 illustration). The controller 64*a* also receives a control signal from a conventional potentiometer 66*a* having a wiper which is rotated in response to rotation of the valve member of the valve 6. Thus, the potentiometer 66*a* provides an electrical feedback signal which, in the preferred embodiment, is within the range between 0 VDC and 10.4 VDC provided by the DAC 56 of the data acquisition and control device 38.

The rotary actuation of the valve 6 is effected through a conventional electrohydraulic valve 68*a* which is controlled by the output of the controller 64*a*, which output results from a comparison between the control signal from the respective DAC and the feedback signal from the potentiometer 66*a*. The valve 68*a* in the preferred embodiment is a four-way closed center electric over hydraulic proportional directional control valve operated by a spool valve which responds to the electrical control signal from the controller 64*a*. Control of the valve 68*a* controls the application of a hydraulic actuating fluid of a hydraulic circuit 70 which includes a conventional variable flow, pressure compensated pump 72 and associated plumbing.

As previously stated, the valve control circuit 40a operates in response to the command signal from the data acquisition and control device 38 and the feedback signal from the potentiometer 66a which is connected to the rotary actuator by which the orifice of the valve 6 is controlled in response to the hydraulic flow from the hydraulic valve actuating circuit 70. The potentiometer 66a is connected such that the voltage it provides is proportional to the position of the valve 6 (i.e., the position of the valve member by which the flow orifice or passage of the valve is set). If the command voltage and the feedback voltage are different, then the controller 64a sends a voltage to the spool valve of the electro-hydraulic valve 68a. The spool valve causes hydraulic power from the circuit 70 to be applied in such a manner as to move the rotary actuator of the valve 6 and thereby position the valve 6 so that the responsive voltage from the potentiometer 66a approaches or equals the value of the command voltage. When these voltages are the same, the controller 64a sends a voltage to the spool valve to stop the flow of hydraulic power through the valve 68a.

The valve control circuits 40b and 40c are the same as the circuit 40a, except that the circuit 40b also includes a manually adjustable potentiometer 74 switchably connectible to the controller 64b in lieu of the command control signal provided by the data acquisition and control device 38. The potentiometer 74 permits manual control of the bulk cement inlet valve 8.

The control apparatus depicted in FIG. 1 operates automatically under control of the application program contained in the data acquisition and control device 38. A listing of the control section of this application program for the preferred embodiment illustrated in FIG. 1 as particularly adapted for controlling the production of cement slurry is set forth in the Appendix hereto.

Prior to operating under the application program, certain parameters need to be entered via the keypad 44. These parameters will be identified hereinbelow in an illustration of the operation of the preferred embodiment of the present invention. In general, however, once the parameters are entered, the data acquisition and control device 38 automatically and continuously supervises the addition of water through the valves 6, 10 and the addition of cement through the valve 8 into the circulation loop 14. This control continues in real time during the entire slurry making process in response to the continuously monitored signals provided by the flowmeters 26, 28 and the densimeter 34 and in response to any parameter changes entered through the keypad 44. As water and cement are added, they flow through the conduit 2 into the compartment 18 of the mixing tub 4 and from there are circulated by the pump 16 where the cement slurry mixes with additional water and dry cement added as needed through the valves 6, 8, 10.

To more clearly illustrate the operation of the present invention and to describe the particular equations implemented in the application program of the preferred embodiment, the following example is given.

EXAMPLE

The system is turned on, and job parameters are entered into the data acquisition and control device 38 via the keypad 44. These parameters include desired slurry density ($P_d$), desired mixing rate ($V_s$), desired water requirement ($r_w$), and desired yield (Y). Water requirement is the volume of water, in gallons, needed for each sack of cement. Yield is the volume of slurry, in cubic feet, each sack of cement will produce. The value of these parameters will vary from cement blend to cement blend, and from job to job. Examples of parameters for a particular job might be: desired slurry density=16.4 pounds per gallon, desired mixing rate=5 barrels per minute, desired water requirement =5.4 gallons per sack, and desired yield=1.4 cubic feet per sack (this desired slurry density, water requirement, and yield are accurate for Class H cement with 35% silica flour, and 0.75% Halliburton Cement Friction Reducer CFR-2).

After the parameters are entered and the rest of the system is ready, "82 RUN" is entered via the keypad 44 of the data acquisition and control device 38. The data acquisition and control device 38 will then operate, via the valve control circuit 40a, the valve 6 to open fully, and it will operate, via the valve control circuits 40b, 40c, the bulk valve 8 and the valve 10 to close fully, allowing approximately 196 gallons of water per minute (the maximum flow of a particular valve 6 and jet) to flow through the conduit 2 into the pre-mix side 18 of the mixing tub 4. The data acquisition and control device 38 will monitor the rate at which water is added using the flowmeter 26 or 28 and will calculate when a quantity of water (e.g., 55 gallons) gauged primarily to the capacity of the compartment 18 of the tub 4 has been added. The data acquisition and control device 38 will then spend 3 seconds, for example, causing the valve 6 to close in order to reduce water hammer. A refinement of this operation is to use the job parameters to calculate the best amount of water to admit for the cement blend being used. This water is used to fill the circulating line and prime the circulating pump 16.

Next, "83 RUN" is entered via the keypad 44 of the data acquisition and control device 38. The data acquisition and control device 38 will now operate, via the valve control circuit 40b, the bulk valve 8 to open 15% (for example; this will vary depending on the cement blend and the 3.1 flow characterization parameter), and it will operate, via the valve control circuits 40a, 40c, the valves 6, 10 to close fully. A quantity of cement is added through the valve 8 so that the density of the cement slurry will increase over a period of about 2 minutes, for example, until the desired density is reached as indicated to the data acquisition and control device 38 by the densimeter 34.

The data acquisition and control device 38 will anticipate reaching the desired slurry density by about 4 seconds, for example, and will cause the bulk valve 8 to close fully. Reaching desired slurry density needs to be anticipated because of the time lags inherent in the pre-mix tub 4 and in the density measurement.

During this time, the resultant slurry is circulated through the loop 14 by the pump 16.

To operate concurrently the water inlet valve(s) and the cement inlet valve with the data acquisition and control device 38 to add more water and cement into the slurry producing circuit for producing more slurry while maintaining the desired slurry density, "84 RUN" is entered via the keypad 44 of the data acquisition and control device 38. In this mode, the blending process continues automatically.

In the "84 RUN" mode, the data acquisition and control device 38 will set the bulk valve 8 using the following equations to compute the desired position (orifice opening) of the valve 8:

$$\alpha = \frac{7.48 \times Y}{r_w}$$

$$P_c = \frac{(\alpha \times P_s - P_w)}{(\alpha - 1)}$$

$$M_c = \frac{V_s \times 42 \times (P_d - P_w)}{1 - P_w/P_c}$$

$$P_v = [(M_c)(R)/3.1]P_c,$$

where:

$\alpha$=slurry/water ratio 7.48=constant for gallons per cubic foot

Y=entered yield of the given blend $r_w$=entered water requirement $P_c$=calculated absolute density of bulk cement $P_s$=slurry design density [determined empirically by mixing a known volume (standard is 1 cubic foot) of dry cement with enough water such that all the cement chemically reacts with all the water; Ps is the density of the resulting slurry, Y is the volume of the resultant slurry, and $r_w$ is the volume of the water needed; for purposes of simplicity, the preferred embodiment assumes that $P_s=P_d$—if this assumption is incorrect, the result can be that the steady-state actual mixing rate will not equal Vs which is usually acceptable because the mixing rate is typically less critical than the density]

$M_c$=calculated mass rate of the dry cement $V_s$=entered desired mixing rate (volume of slurry desired per time unit)

42=constant for gallons per barrel $P_d$=entered desired slurry density $P_w$=density of water (an entered or preset constant)

$P_v$=calculated position of bulk valve 8

R=calculated ratio of water being delivered ($V_a$) (taken from flowmeter signal) to entered desired water rate ($V_d$) if $V_a<V_d$; R=1 otherwise 3.1=numerical characterization for cement flow through a particular type of valve 8; can be changed via the keypad 44 for different valves as needed, therefore generically referred to herein as parameter $a_1$ As the job continues in the "84 RUN" mode, corrections will be computed and made to the position of the bulk valve 8 with a proportional-integral-differential (PID) control algorithm using the following equations, which can be used with or without the foregoing equations:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

[the use of the $V_s$ term in this equation is believed to be novel; it allows the formula to work well with a variety of blends of cement, whereas we determined the portion within the parentheses alone did not work well for such a variety of blends]

where $E_c$=calculated error in dry cement delivery in pounds per minute $P_a$=actual slurry density as measured by densimeter 34

$M_{ce}$=calculated mass rate of dry cement due to error $E_c$ $\int E_c$=calculated time integral of error $E_c$ $\frac{dE_c}{dt}$ = calculated time derivative of error $E_c$ 0.72, 0.24, 1.44 = *PID* parameters determined empirically during cementing tests on particular implementation of apparatus; can be changed via the keypad 44 if needed (such as if other testing shows suitability of other values, particularly for other specific apparatus), therefore generically referred to herein as parameters $a_2$, $a_3$, $a_4$, respectively and the other parameters are the same as defined hereinabove.

The computer of the present invention programmed to implement the foregoing equations defines means for computing the desired position to which the valve 8 is to be moved and means for correcting the position thereof.

In the "84 RUN" mode, the data acquisition and control device 38 will compute the desired positions (orifice openings) of the valve 6 and the valve 10 (as needed) using the equations:

$$V_w = \frac{P_d \times V_s \times 42 - M_c}{P_w}$$

$$P_j = \frac{V_w}{3.33}$$

$$P_b = \frac{V_w}{3.33} - 100$$

where $V_w$=calculated mix water rate $P_j$=calculated position of jet valve 3.33=numerical characterization for water flow through a particular type of valves 6, 10; can be changed via the keypad 44 for different valves as needed; therefore, generically referred to herein as parameter $a_5$ $P_b$=calculated position of bypass valve and the other parameters are the same as defined hereinabove.

If $V_w$ is greater than a selected limit, e.g., 90 gallons per minute, then the water rate will be monitored using the flowmeter 26, otherwise the flowmeter 28 will be used.

As the job continues in the "84 RUN" mode, corrections will be computed and made to the positions of the valves 8, 10 with a PID control algorithm using the equations:

$$E_w = V_d - V_a$$

$$V_e = 0.0 \times E_w + 0.2 \times \int E_w + 0.1 \times \frac{dE_w}{dt}$$

where $E_w$=calculated error in the water rate $V_d$=entered desired water rate (volume of water needed per time unit to obtain $V_s$ for a given blend of cement)

$V_a$=actual water rate as measured by flowmeter 26 or 28

$V_e$=calculated volume rate of water due to error $E_w$
$\int E_w$=calculated time integral of error $E_w$ $\frac{dE_w}{dt}$ = calculated time derivative of error $E_w$

| | | |
|---|---|---|
| 0.0, 0.2, 0.1 | = | *PID parameters determined empirically during* cementing tests on particular implementation of apparatus; can be changed via the keypad 44 if needed (such as if other testing shows suitability of other values, particularly for other specific apparatus): therefore generically referred to herein as parameters $a_6$, $a_7$, $a_8$, respectively. |

A contemplated refinement of the foregoing is to begin opening the valve 10 before the valve 6 is fully open. This is due to the non-linearity of the flow rate versus percent valve opening curve.

The computer of the present invention programmed to implement the foregoing equations related to the water flow defines means for computing the desired position(s) to which the valve(s) 8 (10) is (are) to be moved and means for correcting the position(s) thereof.

To stop adding material, "85 RUN" is entered via keypad 44 of the data acquisition and control device 38. This will fully close the bulk valve 8 and the valve 10, and fully close the valve 6 after 3 seconds, for example, to reduce water hammer.

Figure 2:
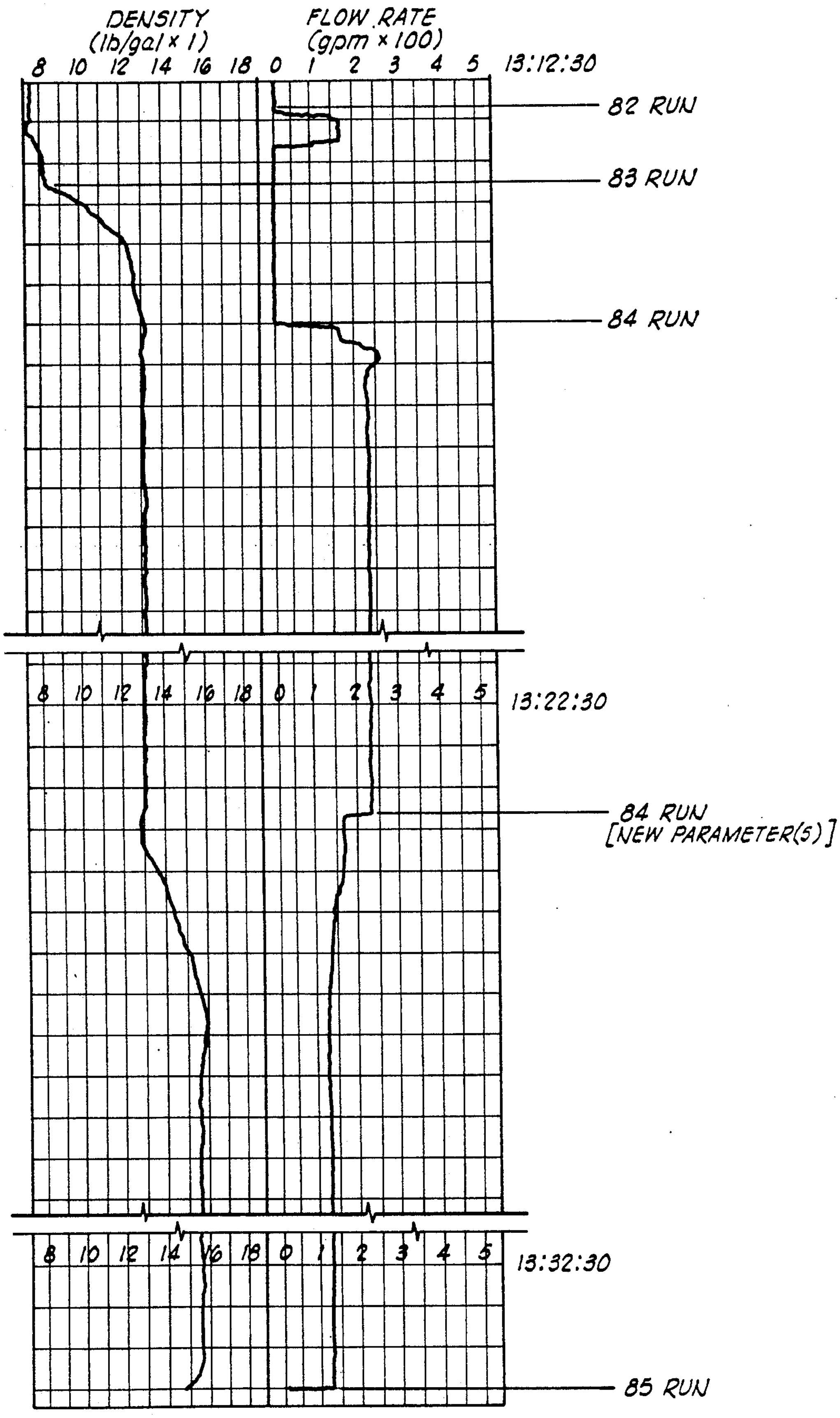
FIG. 2 shows a density record and a flow rate record for a mixing process performed by the apparatus shown in FIG. 1.

Conditions monitored during an implementation of the foregoing example are graphically illustrated in FIG. 2 wherein a density chart is shown on the left and a flow rate chart is shown on the right. The left-hand chart was generated from a signal provided by the densimeter 34, and the right-hand chart was generated in response to a signal from the flowmeter 26. Each horizontal line of the charts represents 30 seconds of elapsed time. Density is charted between 8 and 18 pounds per gallon, and flow rate is charted between 0 and 500 gallons per minute. As marked on the charts, the job commenced by entering "82 RUN" as described above and proceeded through "83 RUN" and "84 RUN" and ended with "85 RUN." For the example illustrated in FIG. 2, it is to be noted that during "84 RUN" new parameters were entered to change the density without having to shut down the operation. Thus, changes can be made "on the fly."

Although specific values and specific components are referred to hereinabove, these are not to be taken as limiting the scope of the present invention which, it is contemplated, can be implemented with any suitable components and for any suitable values resulting therefrom or otherwise.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for automatically controlling the production of a mixture so that the mixture has a desired density and mixing rate, comprising:

a conduit;

first valve means, connected to said conduit, for controllably passing a first substance into said conduit;

second valve means, connected to said conduit, for controllably passing a second substance into said conduit so that a mixture of the first and second substances is formed;

flow detecting means for detecting the flow rate of the second substance passed through said second valve means;

density detecting means for detecting the density of the mixture; and control means, connected to said first valve means, said second valve means, said flow detecting means and said density detecting means, for automatically controlling the operation of said first and second valve means in response to the detected flow rate and density and a desired density and mixing rate entered in said control means, said control means including means for computing a desired position, $P_v$, to which said first valve means is to be moved and for computing a desired position, $P_j$, to which said second valve means is to be moved, wherein:

$$P_v=[(M_c)(R)/a_1]P_c \text{ and } P_j=V_w/a_5,$$

where:

$$M_c = \frac{V_s \times 42 \times (P_d - P_w)}{1 - P_w/P_c}$$

$$P_c = \frac{(\alpha \times P_s - P_w)}{(\alpha - 1)}$$

$$\alpha = \frac{7.48 \times Y}{r_w}$$

$$V_w = \frac{P_d \times V_s \times 42 - M_c}{P_w}$$

$\alpha$=mixture/second substance ratio
Y=yield of the mixture
$r_w$=second substance requirement
$P_c$=absolute density of the first substance
$P_s$=mixture design density
$M_c$=mass rate of the first substance
$V_s$=desired mixing rate
$P_d$=desired mixture density
$P_w$=density of second substance
R=ratio of second substance being delivered to desired second substance rate
$V_w$=mix second substance rate
$a_1$=numerical characterization parameter for first substance flow through said first valve means and
$a_5$=numerical characterization parameter for second substance flow through said second valve means.

2. An apparatus as defined in claim 1, wherein said control means further includes means for correcting the positions of said first and second valve means, including means for computing:

$$E_c = \frac{(P_d - P_a) \times V_s}{P_d - P_w}$$

$$M_{ce} = \left(a_2 \times E_c + a_3 \times \int E_c + a_4 \times \frac{dE_c}{dt}\right) \times V_s$$

where $E_c$=error in first substance delivery in pounds per minute $P_a$=actual mixture density measured by said density detecting means $M_{ce}$=mass rate of first substance due to error $E_c$ $\int E_c$=time integral of error $E_c$ $$\frac{dE_c}{dt} = \text{time derivative of error } E_c$$

$a_2$, $a_3$, $a_4$=PID parameters; and means for computing:

$$E_w = V_d - V_a$$

$$V_e = a_6 \times E_w + a_7 \times \int E_w + a_8 \times \frac{dE_w}{dt}$$

where $E_w$=error in the second substance rate $V_d$=desired second substance rate $V_a$=actual second substance rate as measured by said flow detecting means $V_e$=volume rate of second substance due to error $E_w$ $\int E_w$=time integral of error $E_w$ $$\frac{dE_w}{dt} = \text{time derivative of error } E_w \text{ and}$$

$a_6$, $a_7$, $a_8$=PID parameters.

3. An apparatus for automatically controlling the production of a mixture so that the mixture has a desired density and mixing rate, comprising:

a conduit;

first valve means, connected to said conduit, for controllably passing a first substance into said conduit;

second valve means, connected to said conduit, for controllably passing a second substance into said conduit so that a mixture of the first and second substances is formed;

flow detecting means for detecting the flow rate of the second substance passed through said second valve means;

density detecting means for detecting the density of the mixture; and control means, connected to said first valve means, said second valve means, said flow detecting means and said density detecting means, for automatically controlling the operation of said first and second valve means in response to the detected flow rate and density and a desired density and mixing rate entered in said control means, said control means including means for correcting the positions of said first and second valve means, including means for computing:

$$E_c = \frac{(P_d - P_a) \times V_s}{P_d - P_w}$$

$$M_{ce} = \left(a_2 \times E_c + a_3 \times \int E_c + a_4 \times \frac{dE_c}{dt}\right) \times V_s$$

$E_c$=error in first substance delivery in pounds per minute $P_d$=desired mixture density $P_a$=actual mixture density measured by said density detecting means $V_s$=desired mixing rate $P_w$=density of second substance $M_{ce}$=mass rate of first substance due to error $E_c$ $\int E_c$=time integral of error $E_c$ $$\frac{dE_c}{dt} = \text{time derivative of error } E_c$$

$a_2$, $a_3$, $a_4$=PID parameters; and means for computing:

$$E_w = V_d - V_a$$

$$V_e = a_6 \times E_w + a_7 \times \int E_w + a_8 \times \frac{dE_w}{dt}$$

where $E_w$=error in the second substance rate $V_d$=desired second substance rate $V_a$=actual second substance rate as measured by said flow detecting means $V_e$=volume rate of second substance due to error $E_w$ $\int E_w$=time integral of error $E_w$ $$\frac{dE_w}{dt} = \text{time derivative of error } E_w \text{ and}$$

$a_6$, $a_7$, $a_8$=PID parameters.

4. An apparatus for automatically controlling the production of a cement slurry so that the cement slurry has a desired density, comprising:

a conduit;

a water inlet valve connected to said conduit;

a cement inlet valve connected to said conduit downstream of said water inlet valve;

a cement slurry circulating circuit connected to said conduit;

an electrical signal generating flowmeter connected to said conduit;

an electrical signal generating densimeter connected to said cement slurry circulating circuit; and control means for generating electrical control signals for controlling said water inlet valve and said cement inlet valve in response to electrical signals from said flowmeter and said densimeter and in response to predetermined parameters, said control means including:

a computer connected to receive data in response to the electrical signals of said flowmeter and said densimeter;

data entry means, connected to said computer, for entering into said computer said predetermined parameters including a desired slurry density, a desired mixing rate, a desired water requirement and a desired yield;

first valve control means for controlling said water inlet valve in response to a control signal from said computer and a feedback signal responsive to the position of said water inlet valve; and second valve control means for controlling said cement inlet valve in response to a control signal from said computer and a feedback signal responsive to the position of said cement inlet valve.

5. An apparatus as defined in claim 4, further comprising a second water inlet valve connected to said conduit and responsive to said control means.

6. An apparatus as defined in claim 4, wherein:

said cement slurry circulating circuit includes a mixing tub, having a first compartment and a second compartment, and circulating pump means for pumping cement slurry from said first compartment of said tub to said conduit; and said apparatus further comprises downhole pump means for pumping cement slurry from said second compartment of said tub into a well.

7. An apparatus as defined in claim 4, wherein said computer includes means for computing a desired position, $P_v$, to which said cement inlet valve is to be moved and for computing a desired position, $P_j$, to which said water inlet valve is to be moved, wherein:

$P_v = [(M_c)(R)/3.1]P_c$ and $P_j = V_w/3.33$, where:

$$M_c = \frac{V_s \times 42 \times (P_d - P_w)}{1 - P_w/P_c}$$

$$P_c = \frac{(\alpha \times P_s - P_w)}{(\alpha - 1)}$$

$$\alpha = \frac{7.48 \times Y}{r_w}$$

$$V_w = \frac{P_d \times V_s \times 42 - M_c}{P_w}$$

$\alpha$=slurry/water ratio
Y=yield of the cement slurry
$r_w$=water requirement
$P_c$=absolute density of cement
$P_s$=slurry design density
$M_c$=mass rate of the dry cement
$V_s$=desired mixing rate
$P_d$=desired slurry density
$P_w$=density of water
R=ratio of water being delivered to desired water rate and
$V_w$=mix water rate.

8. An apparatus as defined in claim 7, wherein said control means further includes means for correcting the positions of said first and second valve means, including: means for computing:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

$E_c$=error in dry cement delivery in pounds per minute
$P_a$=actual slurry density measured by said densimeter
$M_{ce}$=mass rate of dry cement due to error $E_c$
$\int E_c$=time integral of error $E_c$ $\frac{dE_c}{dt}$ = time derivative of error $E_c$; and means for computing:

$$E_w = V_d - V_a$$

$$V_e = 0.0 \times E_w + 0.2 \times \int E_w + 0.1 \times \frac{dE_w}{dt}$$

where
$E_w$=error in the water rate
$V_d$=desired water rate
$V_a$=actual water rate as measured by said flowmeter
$V_e$=volume rate of water due to error $E_w$
$\int E_w$=time integral of error $E_w$ and $\frac{dE_w}{dt}$ = time derivative of error $E_w$.

9. An apparatus as defined in claim 4, wherein said control means further includes means for correcting the positions of said first and second valve means, including: means for computing:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

$E_c$=error in dry cement delivery in pounds per minute
$P_d$=desired slurry density
$P_a$=actual slurry density measured by said densimeter
$V_s$=desired mixing rate
$P_w$=density of water
$M_{ce}$=mass rate of dry cement due to error $E_c$
$\int E_c$=time integral of error $E_c$ $\frac{dE_c}{dt}$ = time derivative of error $E_c$; and means for computing:

$$E_w = V_d - V_a$$

$$V_e = 0.0 \times E_w + 0.2 \times \int E_w + 0.1 \times \frac{dE_w}{dt}$$

where
$E_w$=error in the water rate
$V_d$=desired water rate
$V_a$=actual water rate as measured by said flowmeter
$V_e$=volume rate of water due to error $E_w$
$\int E_w$=time integral of error $E_w$ and $\frac{dE_w}{dt}$ = time derivative of error $E_w$.

10. An apparatus for automatically controlling the production of a mixture so that the mixture has a desired characteristic, comprising:

a conduit;

first valve means, connected to said conduit, for controllably passing a first substance into said conduit;

second valve means, connected to said conduit, for controllably passing a second substance into said conduit so that a mixture of the first and second substance is formed;

first characteristic detecting means for detecting a characteristic of the first substance passed by said first valve means;

second characteristic detecting means for detecting a characteristic of the mixture; and control means, connected to said first valve means, said second valve means, said first characteristic detecting means and said second characteristic detecting means, for automatically controlling the operation of said first and second valve means in response to the detected first and second characteristics and a desired density and mixing rate entered in said control means, said control means including means for correcting at least one of said first and second valve means, including means for computing:

$$E_c = \frac{(P_d - P_a) \times V_s}{P_d - P_w}$$

$$M_{ce} = \left(a_2 \times E_c + a_3 \times \int E_c + a_4 \times \frac{dE_c}{dt}\right) \times V_s$$

where $E_c$ = error in first substance delivery in pounds per minute $P_d$ = desired mixture density $P_a$ = actual mixture density measured by said density detecting means $V_s$ = desired mixing rate $P_w$ = density of second substance $M_{ce}$ = mass rate of first substance due to error $E_c$ $\int E_c$ = time integral of error $E_c$ $\frac{dE_c}{dt}$ = time derivative of error $E_c$ and $a_2$, $a_3$, $a_4$ = PID parameters.

11. A method of automatically producing a cement slurry having a desired density and mixing rate, comprising the steps of:

(a) entering into a computer data including a desired slurry density, a desired mixing rate, a desired water requirement and a desired yield;

(b) operating a water inlet valve with the computer so that a quantity of water is flowed into a slurry producing circuit;

(c) operating a cement inlet valve with the computer so that a quantity of dry cement is added into the slurry producing circuit and the quantity of water to produce a slurry having the desired slurry density;

(d) circulating the slurry through the slurry producing circuit; and (e) concurrently operating the water inlet valve and the cement inlet valve with the computer in response to the entered desired slurry density, desired mixing rate, desired water requirement and desired yield to add more water and cement into the slurry producing circuit, thereby producing more slurry, while maintaining the desired slurry density and mixing rate.

12. A method as defined in claim 11, wherein said step (e) includes computing a position, Pv, to which the cement inlet valve is to be moved and computing a position, Pj, to which the water inlet valve is to be moved, wherein:

$$P_v = [(M_c)(R)/3.1]P_c \text{ and } P_j = V_w/3.33,$$

where:

$$M_c = \frac{V_s \times 42 \times (P_d - P_w)}{1 - P_w/P_c}$$

$$P_c = \frac{(\alpha \times P_s - P_w)}{(\alpha - 1)}$$

$$\alpha = \frac{7.48 \times Y}{r_w}$$

$$V_w = \frac{P_d \times V_s \times 42 - M_c}{P_w}$$

$\alpha$ = slurry/water ratio

Y = yield of the cement slurry $r_w$ = water requirement $P_c$ = absolute density of cement $P_s$ = slurry design density $M_c$ = mass rate of the dry cement $V_s$ = desired mixing rate $P_d$ = desired slurry density $P_w$ = density of water R = ratio of water being delivered to desired water rate and $V_w$ = mix water rate.

13. A method as defined in claim 12, wherein said step (e) further includes correcting the position of the cement inlet valve and water inlet valve by computing the following:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

$E_c$ = error in dry cement delivery in pounds per minute $P_a$ = actual slurry density $M_{ce}$ = mass rate of dry cement due to error $\int E_c$ = time integral of error $E_c$ $\frac{dE_c}{dt}$ = time derivative of error $E_c$; and $E_w = V_d - V_a$ $$V_e = 0.0 \times E_w + 0.2 \times \int E_w + 0.1 \times \frac{dE_w}{dt}$$

where $E_w$ = error in the water rate $V_d$ = desired water rate $V_a$ = actual water rate $V_e$ = volume rate of water due to error $E_w$ $\int E_w$ = time integral of error $E_w$ and $\frac{dE_w}{dt}$ = time derivative of error $E_w$.

14. A method as defined in claim 11, wherein said step (e) includes correcting the position of the cement inlet valve and water inlet valve by computing the following:

$$E_c = \frac{(P_d - P_a) \times V_s}{P_d - P_w}$$

$$M_{ce} = \left(0.72 \times E_c + 0.024 \times \int E_c + 1.44 \times \frac{dE_c}{dt}\right) \times V_s$$

$E_c$=error in dry cement delivery in pounds per minute $P_d$=desired slurry density $P_a$=actual slurry density $V_s$=desired mixing rate $P_w$=density of water $M_{ce}$=mass rate of dry cement due to error $\int E_c$=time integral of error $E_c$ $\frac{dE_c}{dt}$ = time derivative of error $E_c$; and $$E_w = V_d - V_a$$

$$V_e = 0.0 \times E_w + 0.2 \times \int E_w + 0.1 \times \frac{dE_w}{dt}$$

where $E_w$=error in the water rate $V_d$=desired water rate $V_a$=actual water rate $V_e$=volume rate of water due to error $E_w$ $\int E_w$=time integral of error $E_w$ and $\frac{dE_w}{dt}$ = time derivative of error $E_w$.

* * * * *